(12) United States Patent
Xie

(10) Patent No.: US 10,300,630 B1
(45) Date of Patent: May 28, 2019

(54) CUTTING EQUIPMENT AND ITS CONTROLLERS

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 16/227,435

(22) Filed: Dec. 20, 2018

(51) Int. Cl.
| | | |
|---|---|---|
| *B28D 1/18* | (2006.01) | |
| *G05B 19/18* | (2006.01) | |
| *B28D 7/00* | (2006.01) | |
| *B28D 7/04* | (2006.01) | |

(52) U.S. Cl.
CPC .............. *B28D 7/005* (2013.01); *B28D 1/18* (2013.01); *B28D 7/04* (2013.01); *G05B 19/182* (2013.01); *G05B 2219/45044* (2013.01); *G05B 2219/45054* (2013.01)

(58) Field of Classification Search
CPC .. B24B 7/06; B28D 1/18; B28D 7/005; B28D 7/04; G05B 19/182; G05B 2219/45044; G05B 2219/45054
See application file for complete search history.

(56) References Cited

U.S. PATENT DOCUMENTS

| | | |
|---|---|---|
| 1,597,103 A | 8/1926 | Oberherr |
| 1,735,674 A | 11/1929 | Copeland |
| 1,935,985 A | 11/1933 | Oberherr |
| 1,949,517 A | 3/1934 | Van Der Pyl |
| 2,044,585 A | 6/1936 | Macht |
| 2,140,197 A | 12/1938 | Batcheller |
| 3,088,713 A | 5/1963 | Gard |
| 3,318,984 A | 5/1967 | Dussel |
| 4,013,616 A | 3/1977 | Wallace |
| 4,209,486 A | 6/1980 | Ross |
| 4,343,752 A | 8/1982 | Cann |
| 4,540,037 A | 9/1985 | Langner |
| 4,601,134 A * | 7/1986 | Hessemann ............. B24B 21/06 451/300 |
| 4,623,561 A | 11/1986 | Groothuizen |
| 5,266,253 A | 11/1993 | Dijkhuizen |
| 5,276,999 A * | 1/1994 | Bando .................... B23Q 7/035 451/303 |
| 5,409,416 A | 4/1995 | Eichhorn et al. |
| 5,720,648 A * | 2/1998 | Green ....................... B24B 7/06 451/178 |
| 5,795,513 A | 8/1998 | Austin |
| 5,885,503 A | 3/1999 | Bordener |

(Continued)

*Primary Examiner* — Kenneth M Lo
*Assistant Examiner* — Michael J Huntley
(74) *Attorney, Agent, or Firm* — Walter J. Tencza, Jr.

(57) ABSTRACT

An apparatus including a controller, and at least two cutting head assemblies. The controller typically includes a computer processor, and a computer memory, having a computer program stored therein. The controller automatically controls the current load of a cutting motor of each of the at least two cutting head assemblies via current sensors, in response to monitoring real time current loads. The controller may also control feed mechanism speed. The feed mechanism may include a conveyor belt. The controller may also be programmed to control a position or height of each of the at least two cutting head assemblies with respect to the feed mechanism. The two or more cutting head assemblies may be attached to a frame, and the controller may control the movement of the frame perpendicular to the direction of movement of feeding mechanism. Cutting head pads may be monitored for wear and replaced if necessary.

26 Claims, 4 Drawing Sheets

(56) References Cited

U.S. PATENT DOCUMENTS

| | | | |
|---|---|---|---|
| 5,997,386 A * | 12/1999 | Dumond, Jr. | B24B 21/04 |
| | | | 451/296 |
| 6,152,809 A * | 11/2000 | Yenawine | B24B 7/242 |
| | | | 451/11 |
| 6,389,666 B1 | 5/2002 | Grothe | |
| 6,461,222 B1 * | 10/2002 | Sato | B24B 37/042 |
| | | | 451/287 |
| 6,517,915 B1 | 2/2003 | Banus | |
| 6,702,967 B2 | 3/2004 | Overholt et al. | |
| 7,056,188 B1 * | 6/2006 | Triplett | B23D 47/045 |
| | | | 125/13.01 |
| 7,815,827 B2 | 10/2010 | Cruz | |
| 8,436,075 B2 | 5/2013 | Buskila et al. | |
| 8,702,886 B2 | 4/2014 | Yaniv et al. | |
| 9,186,819 B1 | 11/2015 | Grzeskowiak, II | |
| 9,511,516 B2 | 12/2016 | Xie | |
| 9,707,698 B1 | 7/2017 | Xie | |
| 9,718,303 B2 | 8/2017 | Greskowiak, II et al. | |
| 10,209,702 B2 * | 2/2019 | Cheng | G05B 19/4065 |
| 2004/0175514 A1 | 9/2004 | Stiattesi | |
| 2006/0101752 A1 | 5/2006 | Sakai | |
| 2008/0079185 A1 | 4/2008 | Jamrussamee et al. | |
| 2012/0283384 A1 | 11/2012 | Cox | |
| 2013/0137346 A1 * | 5/2013 | Toncelli | B24B 7/06 |
| | | | 451/150 |
| 2014/0127450 A1 | 5/2014 | Riman | |
| 2016/0236984 A1 | 8/2016 | Riman | |
| 2017/0355101 A1 | 12/2017 | Toncelli | |
| 2018/0126673 A1 | 5/2018 | Brines | |

\* cited by examiner

CUTTING EQUIPMENT AND ITS CONTROLLERS

FIELD OF THE INVENTION

The invention relates to cutting equipment.

BACKGROUND OF THE INVENTION

A variety of unprocessed slabs, including engineered stone slabs or natural stone slabs, must be cut or calibrated to requirements in a manufacturing process. Typically, this is done with multi-head calibrating equipment to grind the slab thickness to a specified thickness. The number of cutting heads is typically between four and twenty-four.

During processing, the slab is placed on a conveyor belt driven by motor. The slab typically passes through each cutting head in sequence. The series of cutting heads is controlled by a central processor or computer processor in order to determine how much surface material is removed per individual cutting head. For example, Chinese patent CN106737069A describes a specific calibrating machine designed for grinding and polishing slabs. Traditionally multi-head calibrating equipment uses set heights for each cutting head, which are not adjusted in real time. Using this method, the amount of surface material removed by each cutting head is determined by the height set of that individual grinder. If a cutting head is set too high, not enough surface material will be removed, lowering efficiency. If a cutting head is set too low, too much material will be removed, and the grinder's motor will be overloaded and trigger a circuit breaker, stopping the entire machine. In the event of an overloaded grinder, typically the conveyor belt speed is reduced, and/or the grinder height is adjusted in order to reduce load on that specific cutting head.

Usually, the final thickness of the slab is determined by the height of the final cutting head.

In conventional methods the initial thickness of the unprocessed slab is determined at entry via gauge or similar measuring device. Each cutting head is then adjusted either manually or by computer processor in order to remove a specified amount of surface material in sequence. The difference between initial thickness and final desired thickness is determined, and each cutting head is set to remove equal amounts of surface material so that no individual cutting head is overloaded.

However, in actual production, the surface of engineered stone slabs is often uneven and has varying thickness throughout the slab, also known as surface roughness. The surface of the slab being processed has peaks and valleys which will cause uneven load on a specific cutting head depending on the area of the slab being calibrated. Since there is more material to be cut at the valleys, energy consumption is higher compared to peaks which have less material to be cut if the traditional methods are followed where the height of each head in sequence is lowered by the same amount.

Due to this, even with a computer processor determining thickness and adjusting the height of each cutting head, maximum production efficiency is difficult to achieve.

In addition, a variety of engineered and natural stone materials including engineered quartz slabs have different densities and hardness even within a slab. A harder material requires more energy and requires more time to remove surface material without overloading the motor. Natural stone also has varying hardness. Softer material requires less energy to process, so the conveyor belt speed may be increased in conventional methods where the difference in height between each cutting head is equal. In actual production it is difficult to set an optimal conveyor belt speed due to these differences in material hardness, roughness and density.

Japanese patent JP2013056392AA discloses a processing device in which a current load value is monitored, and processing stops when the load current exceeds a preset maximum value. Although useful for protecting machinery, this method significantly inhibits production efficiency.

Due to the above described reasons, it is difficult for each individual cutting head to maintain optimal processing efficiency using conventional automatic control methods. Therefore, the entire system will not be working at optimal conditions and full automation.

SUMMARY OF THE INVENTION

In view of the above mentioned problems with existing technologies, this invention is aimed at establishing a new methodology for using a central controller or computer processor to automatically direct cutting equipment including multi-head mill machines and multi-head calibrating machines via current sensors and manipulation through each individual calibrating head in the series or array, in addition to feed mechanism or conveyor belt speed. The equipment is controlled by a computer program stored in computer memory, according to real-time current loads of each individual calibrating head so that each head is dynamically adjusted to achieve maximum efficiency. Adjustments may include feed mechanism or conveyor belt speed adjustments, cutting head height adjustments, and cutting head frame horizontal movement speed adjustments. This ensures that the entire system is running at high efficiency in an automatically controlled environment. Specifically, as it relates to this invention the cutting equipment may include multi-head cutting machines.

In at least one embodiment an apparatus is provided comprising: a controller including a computer memory and a computer processor; and at least two cutting head assemblies, wherein a computer program is stored in the computer memory. Each of the at least two cutting head assemblies includes a cutting head motor, in at least one embodiment.

Typically, the computer processor is configured to execute the computer program to achieve the following steps: receive a real time load current of each cutting head motor of each of the at least two cutting head assemblies; and control the real time load current of each cutting head motor of each of the at least two cutting head assemblies to be within a range defined by a lower limit and an upper limit in response to the received real time load current of each of the at least two cutting head assemblies.

The apparatus may also include a feeding mechanism for inserting a hard material between the at least two cutting head assemblies and the feeding mechanism; wherein the computer processor is configured to execute the computer program to control the speed of the feeding mechanism to thereby ensure that the real time load current of each cutting head motor of each of the at least two cutting head assemblies is within the range.

Each of the at least two cutting head assemblies may include a cutting head pad which is configured to perform a cutting function on a hard material.

In at least one embodiment, the computer processor is configured to execute the computer program to detect the size of a hard material and to control the at least two cutting head assemblies to reduce the size of the hard material to a desired size within a predetermined tolerance. The computer processor may also be configured to execute the computer program to set an initial position of each of the at least two cutting head assemblies above the feeding mechanism prior to insertion of the hard material between the feeding mechanism and one or more of the at least two cutting head assemblies.

The computer processor may be further configured to execute the computer program to adjust the position of each of the at least two cutting head assemblies as the hard material moves in between the at least two cutting head assemblies.

In at least one embodiment, the computer processor is configured to execute the computer program to monitor the abrasiveness of each cutting head pad of each of the at least two cutting head assemblies, and to provide a signal to indicate when one or more of the cutting head pads of the at least two cutting head assemblies should be replaced due to sufficient wear.

The at least two cutting head assemblies may be fixed to a frame which is configured to move along one or more tracks, in a direction perpendicular to movement of the feeding mechanism. The feeding mechanism may include a conveyor belt.

The computer processor may be configured to execute the computer program to adjust the position of each of the at least two cutting head assemblies as the hard material moves in between the at least two cutting head assemblies and the feeding mechanism.

In at least one embodiment a method is provided which includes receiving a real time load current of each cutting head motor of each of at least two cutting head assemblies at a controller; and controlling through use of a controller, the real time load current of each cutting head motor of each of the at least two cutting head assemblies to be within a range defined by a lower limit and an upper limit in response to the received real time load current of each of the at least two cutting head assemblies; and wherein the upper and lower limit are stored in computer memory.

The method may further include using a feeding mechanism to feed a hard material between the at least two cutting head assemblies and the feeding mechanism; and controlling the speed of the feeding mechanism by use of the controller to thereby ensure that the real time load current of each cutting head motor of each of the at least two cutting head assemblies is within the range Each of the at least two cutting head assemblies may include a cutting head pad which is configured to perform a cutting function on a hard material.

The method may further include using the controller to detect the size of a hard material and to control the at least two cutting head assemblies to reduce the size of the hard material to a desired size within a predetermined tolerance. The controller may be further used to set an initial position of each of the at least two cutting head assemblies above the feeding mechanism prior to insertion of the hard material between the feeding mechanism and one or more of the at least two cutting head assemblies.

The method may further include using the controller to adjust the position of each of the at least two cutting head assemblies as the hard material moves in between the at least two cutting head assemblies; and using the controller to monitor the abrasiveness of each cutting head pad of each of the at least two cutting head assemblies, and to provide a signal to indicate when one or more of the cutting head pads of the at least two cutting head assemblies should be replaced due to sufficient wear.

The at least two cutting head assemblies may be fixed to a frame which is configured to move along one or more tracks, in a direction perpendicular to movement of the feeding mechanism. The feeding mechanism may include a conveyor belt.

The method may further include using the controller to adjust the position of each of the at least two cutting head assemblies as the hard material moves in between the at least two cutting head assemblies and the feeding mechanism.

DETAILED DESCRIPTION OF THE DRAWINGS

Figure 1:
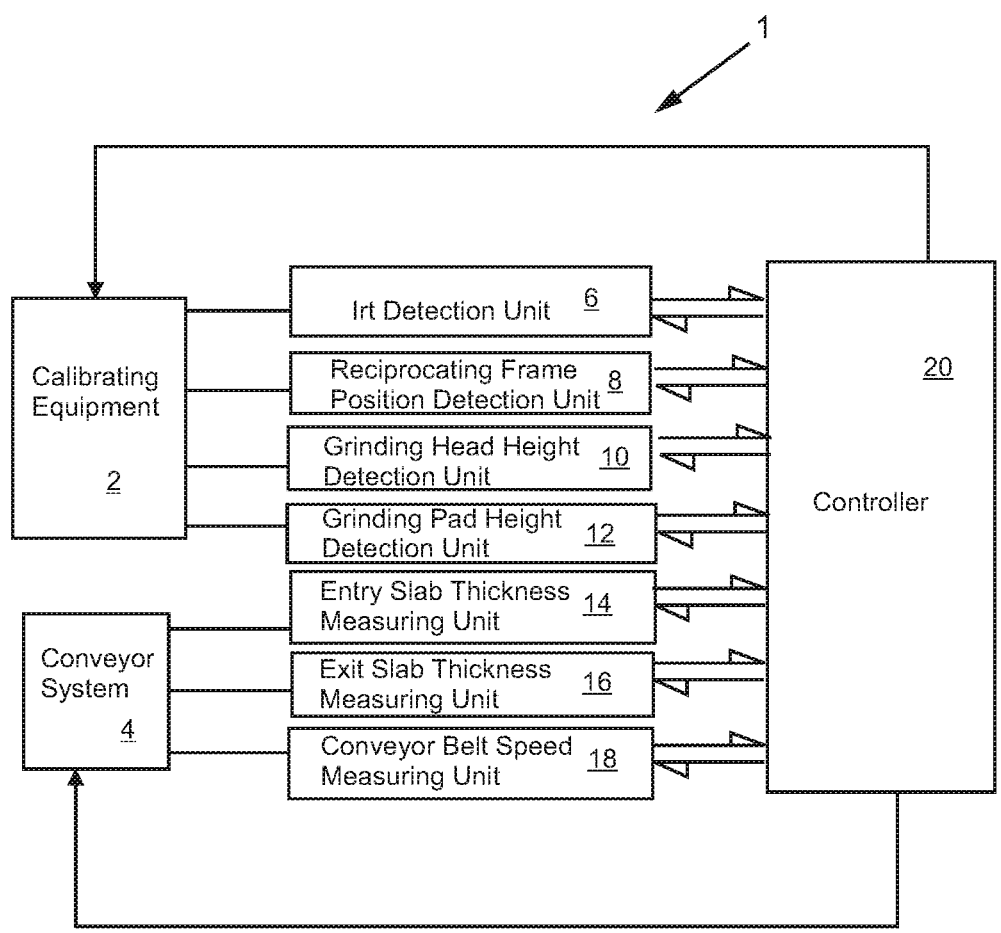
FIG. 1 is a process diagram detailing how equipment in one or more embodiments of the present invention integrates with each other.

In at least one embodiment, an apparatus, system, method, and/or process 1 is provided. The apparatus, system, method, and/or process 1 includes calibrating equipment 2, conveyor system 4, real-time current (Irt) of each individual cutting head's motor detection unit 6, reciprocating frame position detection unit 8, cutting or grinding head height detection unit 10, grinding pad height detection unit 12, entry slab thickness measuring unit 14, exit slab thickness measuring unit 16, conveyor belt speed measuring unit 18, and controller 20. The controller 20 receives signals, data, and/or inputs from the components 6, 8, 10, 12, 14, 16, and 18 as shown in FIG. 1; the controller 20 supplies signals, data, and/or outputs to the components 6, 8, 10, 12, 14, 16, and 18 to control those components.

In at least one embodiment, the calibrating equipment 2 may include cutting head assemblies 22, 24, 26, 28, 30, and 32 (shown in FIGS. 3 and 4), which include height adjusting motors 22a, 24a, 26a, 28a, 30a, and 32a (shown in FIG. 4) cutting head motors 22b, 24b, 26b, 28b, 30b, and 32b (shown in FIGS. 3 and 4), cutting head pads 22c, 24c, 26c, 28c, 30c, and 32c (shown in FIGS. 3 and 4), and height detection sensors 22d, 24d, 26d, 28d, 30d and 32d (shown in FIGS. 3 and 4) respectively. The calibrating equipment 2 may also include frame or arm 44, and motors 46a and 46b which allows the arm 44 to move along tracks 52 and 54.

Figure 3:
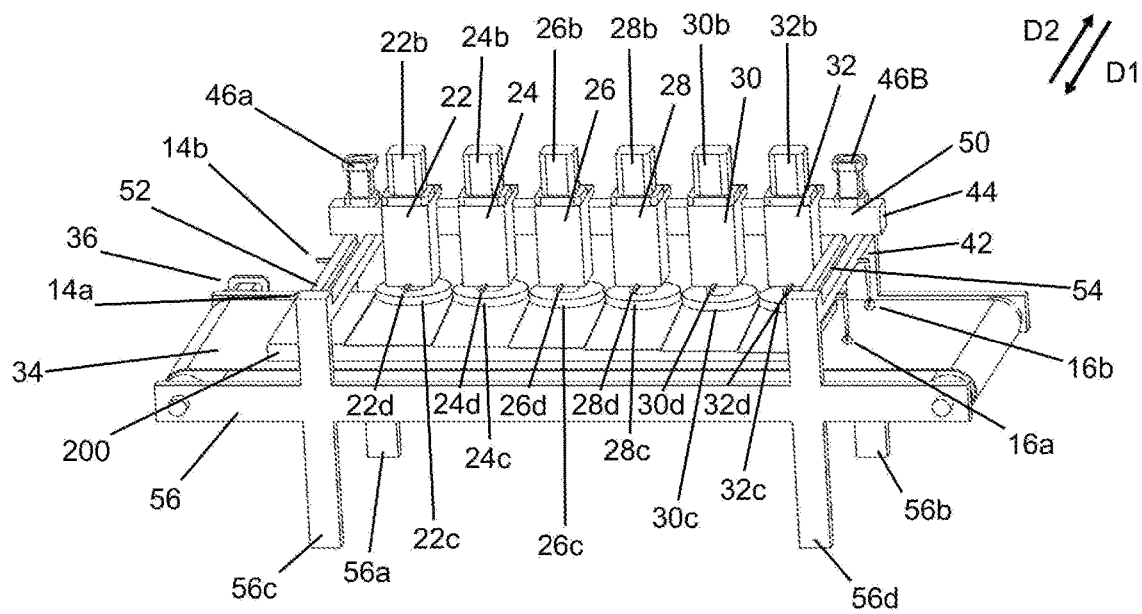
FIG. 3 is a simplified perspective view of calibrating equipment, referred to in FIG. 2, for use with one or more embodiments of the present invention.

In at least one embodiment, the conveyor system 4 may include the conveyor belt 34 and the conveyor belt motor 36 shown in FIG. 3.

The controller 20, includes a computer processor and a computer memory in which a computer program is stored. The controller 20 may further include a computer display, and a computer interactive device, which may include computer keyboard, computer mouse, and/or computer touch screen.

Figure 4:
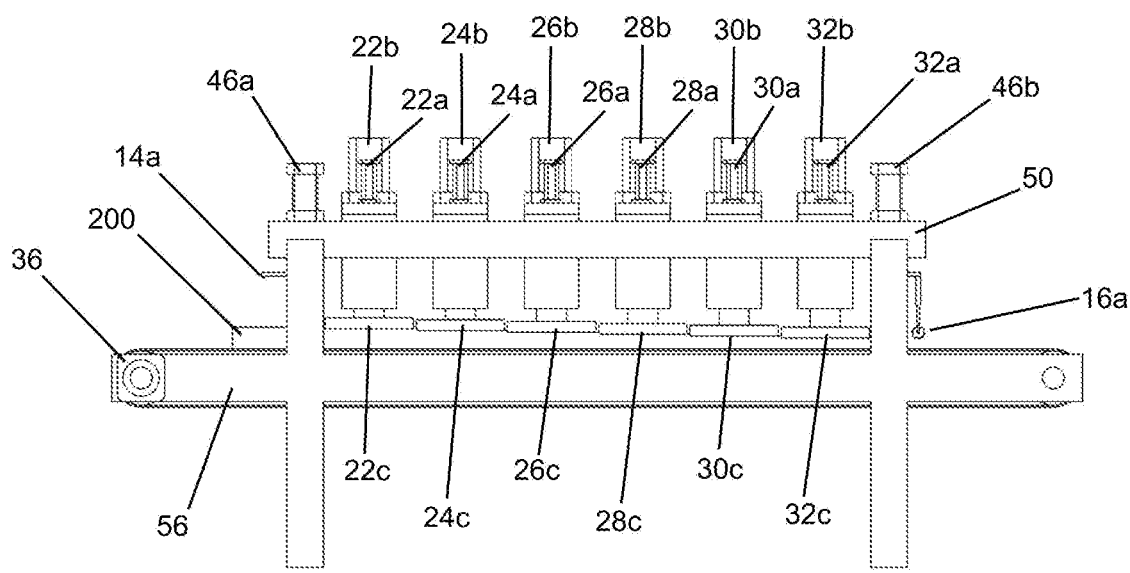
FIG. 4 is a side view of calibrating equipment referred to in FIGS. 2 and 3.

In at least one embodiment, the controller 20 implements the following steps:

As shown by the combination of FIGS. 1, 3, and 4, the apparatus 1 includes cutting head assemblies 22, 24, 26, 28, 30, and 32, which include height adjusting motors 22a, 24a, 26a, 28a, 30a, and 32a, cutting head motors 22b, 24b, 26b, 28*b*, 30*b*, and 32*b*, and cutting head pads 22*c*, 24*c*, 26*c*, 28*c*, 30*c*, and height position sensors 22*d*, 24*d*, 26*d*, 28*d*, 30*d* and 32*d*, respectively.

The apparatus 1 also includes conveyor belt 34, conveyor belt motor 36, a slab thickness entry detection and measuring device including components 14*a* and 14*b* (together make up unit 14 of FIG. 1), slab thickness exit detection and measuring device including components 16*a* and 16*b* (together make up unit 16 of FIG. 1), component 42, arm 44, arm motors 46*a* and 46*b*, tracks 52 and 54, and overall housing 56 including legs 56*a*, 56*b*, 56*c*, and 56*d*. FIG. 3 also shows slab 200 which sits on the conveyor belt 34. In at least one embodiment, the entire subassembly 50 is comprised of components 22, 24, 26, 28, 30, 32, 44 and 46 and may travel in opposite directions $D_1$ and $D_2$, shown in FIG. 3, in a reciprocating fashion along two parallel tracks 52 and 54.

Figure 2:
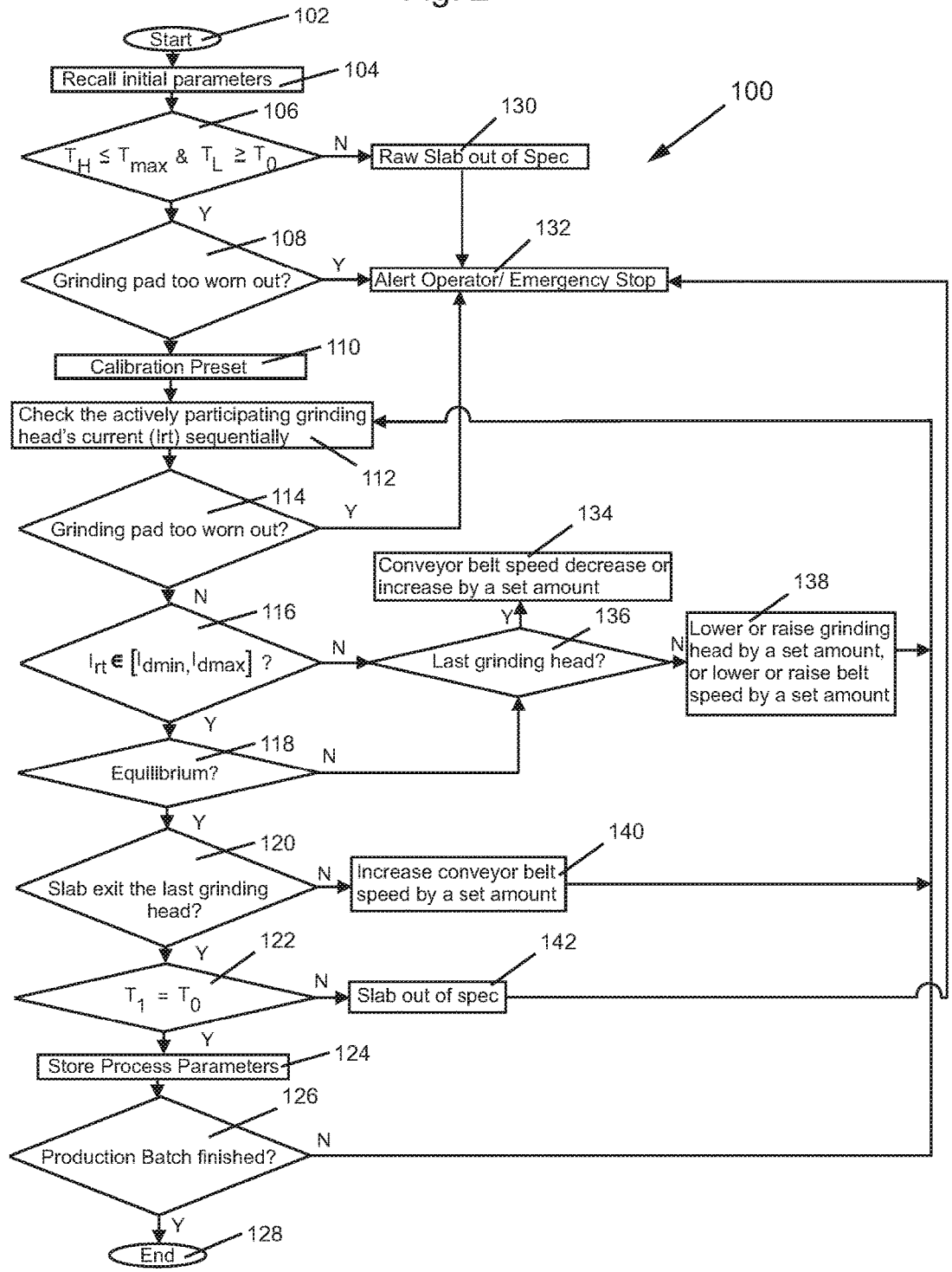
FIG. 2 is a flow chart of operations of a controller of calibrating equipment in accordance with an embodiment of the present invention.

FIG. 2 shows a flow chart 100 of steps 102, 104, 106, 108, 110, 112, 114, 116, 118, 120, 122, 124, 126, 128, 130, 132, 134, 136, 138, 140, and 142 in accordance with an embodiment of the present invention.

In at least one embodiment, the real time current ($I_{rt}$) of two or more of the cutting head motors 22*b*-32*b* of FIG. 3, is monitored through detection unit 6, by controller 20. The transfer speed of the main conveyor belt 34 of FIG. 3, ($V_b$) and/or the height of each individual cutting head of heads 22-32 above the top surface of the belt 34 are monitored and adjusted in real time in order to achieve maximum efficiency. The previous steps are repeated in the production cycle so that the real-time average current load across all cutting head motors ($I_{av}$) or motors 22*b*-32*b* approaches the upper limit of the designed current load ($I_{Dmax}$).

The upper and lower design limit values are specified as $I_{Dmax}$ and $I_{Dmin}$ respectively. The real-time load current $I_{rt}$ of each of the main drive motors 22*b*-32*b* is set to be within the design current range ($I_{rt} \in [I_{Dmin}, I_{Dmax}]$). In addition, each individual cutting head motor or motors 22*b*-32*b* is adjusted in order to approach the real-time average current load $I_{av}$.

The production period refers to the range of positions between when a first slab, such as slab 200 of a batch of unfinished slabs begins entering the first cutting unit, such as 22 shown in FIG. 3, via the main conveyor belt 34 to start processing the unfinished slab 200 through the cutting process to when the last portion of the last slab exits the last cutting unit, such as cutting unit 32.

Real-time average load current $I_{av}$ is the real-time average load current of all cutting head motors 22*b*-32*b* that are currently in contact with a slab, such as slab 200. For example, if only the first cutting head pad 22*c* of cutting head 22 is in contact with the slab 200, the average load current is the load current of the first head motor 22*b*. If only the first and second head pads 22*c* and 24*c* are in contact with the slab 200, the average load current for the cutting motors, in contact with the slab 200 is the average of the first and second cutting head motors 22*b* and 24*b*, and so on in order for a computer processor of the controller 20 to calculate a real-time average load current $I_{av}$, and to store this in computer memory of the controller 20.

The computer processor of the controller 20 implements the following steps when executing the computer program stored in the computer memory. The real-time load current $I_{rt}$ of any individual cutting head motor of motors 22*b*-32*b* that is participating in cutting work in real time, in at least one embodiment, is controlled to be lower, by the controller 20, than the design specified upper limit value ($I_{Dmax}$) and higher than the design specified lower limit value ($I_{Dmin}$), both of which limit values are stored in computer memory of the controller 20. In order to achieve this the height adjusting motor or motors 22*a*-32*a*, of each individual cutting head assembly 22-32, raises or lowers the respective cutting head pad 22*c*-32*c*, with respect to the slab 200, and with respect to the conveyor belt 34, in order to increase or decrease $I_{rt}$ (typically except for the last cutting head assembly 32). The motor speed of the main conveyor belt 34 ($V_b$) may be increased or decreased by a set amount by the controller 20 through the unit 18, or in conjunction with the cutting head height adjustments in order to adjust each individual $I_{rt}$ to approach the average current $I_{av}$ and to maintain the entire system at ideal levels ($I_{rt} \in [I_{Dmin}, I_{Dmax}]$). This method allows the system to improve cutting efficiency.

Since the height of the final cutting head 32 determines the finished slab thickness, typically this cutting head's height is not adjusted except for when the last cutting head's cutting pad 32*c* wears down. The present invention, in one or more embodiments, involves multiple cutting heads, such as heads 22-32 working in unison. The height adjustment process for each individual cutting head or heads 22-32, from the first head 22 to the last head 32 is coordinated in a step-down sequence so that no individual cutting head is overloaded.

Furthermore, when executing the program, the computer processor of the controller 20 implements the following steps:

Based on the specified thickness of the final product, the thickness of the slab 200 at the end of the final cutting head 32 is monitored in real time, such as by component 16 shown in FIG. 1, and compared by the controller 20 with the specified thickness, which may be stored in computer memory of the controller 20. If there are any discrepancies in thickness an alert is issued, such as through an audio device or visual computer monitor of the controller 20, to inspect the slab 200.

Furthermore, the processor of the controller 20 implements the following steps:

As each cutting head assembly or assemblies 22-32 is used in operation, the pads 22*c*-32*c*, respectively, in contact with the slab 200 begins to wear. As part of an initial calibration a calibration slab with consistent thickness is positioned underneath the assembly or assemblies 22-32. The cutting head motors 22*b*-32*b* are turned on and the real-time load current $I_{rt}$ is monitored. The height of each assembly with a new pad is lowered until the pad is in contact with the slab, which is detected by a change in current load. This height is recorded into computer memory of controller 20 in accordance with a computer program stored in the computer memory of the controller 20. As the pad begins to wear if the height of a worn pad is detected to lower beyond a critical value, which may be stored in computer memory of the controller 20, an alert is issued to the operator, such as through an audio device or visual monitor of controller 20, to replace the worn pad of the particular cutting head assembly of cutting head assemblies 22-32. Each time a specific cutting head get a replacement pad, a reset will be recorded and the new height of the cutting head with new pad will be adjusted by the controller.

Each cutting unit of units 22-32 may be a grinding unit, specifically a grinding head assembly. The production period is specified as the range of positions between when a first slab 200 of a batch of unfinished slabs begins entering the first cutting unit 22 via the main conveyor belt 34 to start processing the unfinished slab, through the cutting process to when the last portion of the last slab exits the last cutting unit 32.

More specifically, the processor or controller 20 implements the following steps when executing the program as shown in FIG. 2.

At step 102:

A process of flow chart 100 shown in FIG. 2 is started.

At step 104:

The controller 20 detects and reads the original process parameters, including:

Unprocessed slab thickness of slab 200, desired slab thickness, each grinding head's height and current parameters, grinding heads assembly motors 46a and 46b speed, conveyor belt 34 speed, maximum speed allowed by the conveyor belt 34, initial belt speed of the conveyor belt 34, each grinding head's pad wear and alert value, set incremental values of conveyor belt 34 speed and between each cutting head height, etc.

At step 106:

The controller 20 detects the thickness of the unprocessed slab 200 to be processed, through component 14 shown in FIG. 1, and specifies the thickest portion height as ($T_h$) and the thinnest portion height as ($T_l$). The processor of controller 20 then checks to ensure $T_h \leq T_{max}$ where $T_{max}$, stored in computer memory of controller 20, represents the largest thickness the machinery shown in FIG. 3, allows. In addition, the processor of controller 20 checks to ensure that, $T_l \geq T_0$ where $T_0$ is the specified finished product's thickness. If either of these two conditions are not met an alert is issued, such as through an audio device or visual computer monitor of the controller 20, to inspect the slab 200.

At step 108:

The corresponding grinding head pad of pads 22c-32c wear data is inspected and compared by the controller 20, with the preset wear limit value stored in computer memory of the controller 20. If this wear amount exceeds the wear limit value the program proceeds to step 132, where an alert is issued via audio or video alert by speaker or computer monitor, respectively, of controller 20, to replace the grinding pad of the particular pads 22c-32c and/or an emergency stop is initiated.

At step 110:

The controller 20 is programmed by computer software to set the initial height position of each grinding pad 22c-32c of assemblies 22-32, by using height adjustment motors 22a-32a. The height of the first grinding head pad 22c with respect to the conveyor belt 34 and the height of the last grinding head pad 32c, with respect to the conveyor belt 34, which are values $T_h$ and $T_0$, respectively, are specified, and the heights of all grinding head pads in between (24c, 26c, 28c, and 30c) are set above the conveyor belt 34 so that each subsequent grinding head pad has a height drop of ($T_h$-$T_0$)/n where n is the number of grinding head assemblies of 22-32 being used.

The controller 20 is programmed by computer software to start the corresponding motors, including the main motors 22b, 24b, 26b, 28b, 30b, and 32b of the grinding heads 22c, 24c, 26c, 28c, 30c, and 32c, respectively, the grinding unit assembly 50, the main conveyor belt motor 36, and to set the initial belt speed $V_b$ of the main conveyor belt 34 so that it does not exceed the maximum allowed value $V_{bmax}$.

At step 112:

The cycle of monitoring and adjusting equipment is initiated, which includes steps 114 through 122. Each value of interest is monitored by the controller 20 and adjusted in real time, throughout the process, including: the cycle of detecting real-time load current $I_{rt}$ of each grinding head motor of motors 22b-32b, is compared to the specified desired current in computer memory, and the real time load current $I_{rt}$ is adjusted, such as by adjusting speed of the conveyor belt 34 or adjusting height of one or more of assemblies 22-32.

At step 114:

Real time detected wear data of each corresponding grinding head pad of pads 22c-32c is determined by height sensors 22d-32d and is inspected and compared by the controller 20, with the preset wear limit value stored in computer memory of the controller 20. If the current wear data or amount exceeds the wear limit value stored in computer memory, an alert is issued to replace the particular grinding pad of the pads 22c-32c.

At step 116:

The real-time current of a specific grinding head motor of motors 22b-32b is checked to determine if $I_{rt} > I_{dmax}$ or $I_{rt} < I_{dmin}$, that is $I_{rt} \notin [I_{dmin}, I_{dmax}]$. If any grinding head is not within tolerance, i.e $I_{rt} \notin [I_{dmin}, I_{dmax}]$, the program executed by the processor of the controller 20 proceeds to step 136. If the real time current of all grinding head motors of motors 22b-32b are within tolerance, the program proceeds to step 118.

At step 136:

The program determines if the grinding head that is out of tolerance, with respect to real time current, is the last grinding head 32 in the sequence. If it is the last grinding head 32, the program proceeds to step 134. If it is not the last grinding head 32 the program proceeds to step 136.

At step 134:

If $I_{rt} > I_{dmax}$ or $I_{rt} > I_{av}$, the velocity of the conveyor belt 34 is lowered by a set value, which is stored in computer memory of the controller 20, if $I_{rt} < I_{dmin}$ or $I_{rt} < I_{av}$ the velocity of the conveyor belt 34 is raised by a set value, which is stored in computer memory of the controller 20. The computer program then resets to step 112.

At step 138:

If $I_{rt} > I_{dmax}$ or $I_{rt} > I_{av}$, the height of the particular grinding head of grinding heads 22-32, above the conveyor belt 34, is raised by a set value, which is stored in compute memory of the controller 20, or the speed of the conveyor belt 34 is decreased by a set value, which is stored in computer memory of the controller 20, if $I_{rt} < I_{dmin}$ or $I_{rt} < I_{av}$, the height of the particular grinding head of heads 22-32 is lowered by a set value, which is stored in computer memory of the controller 20, or the conveyor belt speed is increased by a set value, which is stored in computer memory of the controller 20. The computer program then continues the process at step 112.

At step 118:

Each individual grinding heads' current $I_{rt}$ is compared to the real-time average current load $I_{av}$ across all actively participating grinding heads of heads 22-32. If the difference between any individual grinding heads' current $I_{rt}$ and $I_{av}$ is greater than a set tolerance, the program proceeds to step 136. If all grinding heads' current is within tolerance, the program proceeds to step 120.

At step 120:

The position of the slab 200 is determined and checked by the computer processor of the controller 20, to see if the slab 200 has exited the last grinding head 32 via devices 16a and 16b. If the slab 200 has not exited the last grinding head 32, the program proceeds to step 140 where the conveyor belt speed is increased by a set amount, which is retrieved from computer memory of the controller 20. After step 140 the program goes back to step 112. If the slab 200 has exited the last grinding head 32, the program proceeds to step 122.

At step 122:

The program checks if the slab thickness $T_1$ as measured by devices 16a and 16b is equal to the specified finished product thickness $T_0$. If $T_1 \neq T_0$ the program proceeds to step 142, where the current process parameters are recorded in computer memory of the controller 20, and the slab 200 is determined to be out of spec. The program then proceeds to step 132, where an alert is issued, such as an audio or visual alert, by the controller 20, for an operator to inspect the slab 200 and/or an emergency stop is initiated. If $T_1 = T_0$ the program proceeds to step 124.

At step 124:

The process parameters of the current production bath are recorded in computer memory of the controller 20 and the program proceeds to step 126.

At step 126:

The program determines if the current production batch has been completed via device 14 and the current load of all grinding heads. If the production batch has not finished, the program loops back to step 112. If the production batch is completed, the program ends with step 128.

The entire process of steps 112-126 of FIG. 2, may be completed within, but not limited to, 0.1 seconds-1.0 second according to production requirements.

By utilizing this system of monitoring real-time load current $I_{rt}$ of each individual grinding head motor of motors 22b-32b and the average current $I_{av}$, adjustments may be made which include adjusting the velocity of the conveyor belt 34 by set values retrieved from the computer memory of the controller 20, and/or adjusting the height of each individual grinding head pad of pads 22c-32c above the conveyor belt 34 by a set value retrieved from the computer memory of the controller 20 In general, adjusting the speed of the conveyor belt 34 affects the current in all grinding head motors 22b-32b, and adjusting the height of any individual grinding head pad of pads 22c-32c affects the current only at that specific grinding head. Therefore, adjusting the speed of the conveyor belt 34 typically leads to a quicker result of the system reaching equilibrium.

The present invention in one or more embodiments also discloses multi-head cutting equipment using the above methods and a computer processor of controller 20, and the corresponding technical solution is implemented in at least one embodiment as follows:

Cutting equipment that includes:

A cutting assembly comprised of N cutting units (22-32) and a frame 44 shown in FIG. 3, where the N cutting units (22-32) are mounted on the frame 44 and arranged sequentially, in which N≥2.

The main conveyor belt 34.

The process parameters are collected by the controller 20, including but not limited to real-time current load $I_{rt}$ of each motor of motors 22b-32b of each cutting head assembly of assemblies 22-32, the height of each cutting head pad of pads 22c-32c above the belt 34, the position of the cutting head frame 44, the main conveyor belt 34 speed $V_b$, slab entry and exit thickness $t_1$ and $t_0$ respectively measured via gauges 14a, 14b, 16a and 16b.

And, as mentioned earlier, the controller 20.

The cutting assembly (includes frame 44 and cutting units 22-32), the conveyor belt 34 and each process parameter are respectively collected by the computer processor of controller 20 and configured to perform the program stored in computer memory of the controller 20.

The cutting equipment described above may be stone slab calibrating equipment designed to calibrate slabs to a specified thickness, including:

A calibrating assembly comprised of frame 44 and N calibrating units (22-32), where the calibrating units are mounted on the frame 44 which may travel in opposite directions $D_1$ and $D_2$ in a reciprocating fashion along two parallel tracks 52 and 54, shown in FIG. 3, and are arranged sequentially along the length of the conveyor belt 34, wherein N≥2.

The conveyor belt device or system 4 is comprised of a main conveyor belt 34 and a driving motor 36. The frame 44 is positioned parallel to the main conveyor belt 34 and its length direction is consistent with the length direction of the main conveyor belt 34. In the working state, the frame 44 travels in directions $D_1$ and $D_2$, as shown in FIG. 3, in a reciprocating motion perpendicular to the length of the conveyor belt 34, the movement of the frame 44 is sufficient enough so that the calibrating heads 22-32 cover the entire width of the slab 200 to be processed and does not exceed the width of the main conveyor belt 34.

The computer processor of the controller 20 collects process parameters, including but not limited to the real-time load current $I_{rt}$ of each calibrating unit's calibrating head motor of motors 22b-32b, height of each calibrating head pad of head pads 22c-32c, the conveyor belt 34 speed $V_b$, and slab entry and exit thickness $t_1$ and $t_0$ respectively measured via measurement devices 14 and 16, respectively.

The reciprocating frame assembly 50 (including frame 44 and heads 22-32), the conveyor belt 34, and each process parameter measurement device are connected to the computer processor of controller 20 and are configured to perform the computer program.

Specifically, the method in which the calibrating equipment 2 grinds slabs to a specified thickness is described by steps of the flow chart 100 of FIG. 2, in one or more embodiments, as described previously, by a computer processor of the controller 20.

Compared with prior art, the method described in one or more embodiments of the present invention and the equipment used for automating this process including cutting, grinding, milling and polishing equipment used to grind or cut material take into account various influencing factors in the production process such as real-time load current $I_{rt}$ of the grinding heads, real-time average current of all the grinding heads $I_{av}$, monitoring and adjusting the current by adjusting the motor which controls conveyor belt speed $V_b$ as well as the height of each individual grinding head in order to ensure that the entire system is working in equilibrium. This process allows for fully automated production which raises efficiency, lowers cost and increases quality.

A computer processor, including computer memory in which a computer program is stored, which are part of controller 20, executes the program to achieve the following steps: Monitors the real-time current of each actively participating calibrating unit's grinding head motor (of motors 22b-32b), $I_{rt}$, the average current across each actively participating grinding head motor $I_{av}$, and adjusts the speed of the conveyor belt 34 $V_b$ and/or the height of each individual grinding head pad of pads 22c-32c with respect to conveyor belt 34, so that the current across all actively participating grinding head motors of motors 22b-32b. are in equilibrium. This process of monitoring and adjusting are repeated throughout a production cycle so that each actively participating grinding head motor of motors 22b-32b real-time current $I_{rt}$ and the real-time average current load $I_{av}$ across all actively participating grinding head motors approaches the specified upper limit design current $I_{dmax}$.

The overall equilibrium state of the system refers to the real-time load current $I_{rt}$ of each grinding unit of units 22-32 actively participating in grinding are within the specified design range $I_{rt} \in [I_{dmin}, I_{dmax}]$, the real-time average load current $I_{av}$ is the average load current across all grinding heads that are actively participating in grinding, and the real-time average load current of all actively participating $I_{av}$ is being adjusted in real time to approach the specified upper limit design current $I_{dmax}$.

The computer processor of the controller 20 of one or more embodiments of the present invention monitors real-time load current of each individual grinding head of heads 22-32 and maintains an equilibrium state by adjusting the motor 36 which controls conveyor belt 34 speed $V_b$ and adjusts the height of each individual grinding head pad of pads 22c-32c above the conveyor belt 34.

The controller 20 can be used in a variety of cutting equipment, such as calibrating, milling, grinding or polishing materials to a specified thickness or size. Specifically, if the computer processor of the controller 20 is applied to calibrating equipment, a program is stored in the memory and the processor executes the program in which each actively participating grinding head motor of motors 22b-32b (but which may typically be four to thirty heads) real-time load current $I_{rt}$ is monitored and the conveyor belt speed $V_b$ and the height of each grinding head of heads 22-32 are adjusted to maintain an equilibrium state. This process of monitoring current and adjusting speed and height are repeated continuously so that each actively participating grinding head motor's real-time load current $I_{rt}$ and the average current $I_{av}$ both approach the specified upper limit design current $I_{dmax}$.

Each grinding head may have a grinding pad attached, such as grinding pads 22c-32c. The computer processor of the controller 20 also executes a program in which the abrasive wear of each grinding pad is monitored from an initial thickness, and when the wear level reaches a critical value, an alert is sent to the operator, through an audio device or visual computer monitor of controller 20 to replace the grinding pad of the particular grinding head.

The calibrating machine and/or apparatus 1 uses the above computer process in addition to the following, as shown in FIGS. 1-4:

The calibrating assembly, in at least one embodiment, is comprised of a frame 44 and six grinding units 22-32 (which may include any further number of grinding units), which are fixed on the reciprocating arm 44 of the frame and are arranged sequentially along the length of the frame 44.

The calibrating assembly is also comprised of a main conveyor belt 34 and a drive motor 36, the reciprocating arm of the frame 44 is parallel to the top of the main conveyor belt 34, and the length direction of the arm 44 and conveyor belt 34 are parallel. In its working state, the reciprocating arm 44 travels back and forth perpendicular to the length of the conveyor belt 34; the reciprocating arm's travel path is long enough in order to ensure that the entire surface of the product or slab 200 being processed is covered by the grinding heads 22-32 and does not exceed the width of the main conveyor belt 34.

The computer processor of the controller 20 collects process parameters utilizing devices including a device or detection unit 6 of FIG. 1, which may include a plurality of devices, such as a plurality of ammeters, or other meters to measure current, to monitor and/or measure the load current $I_{rt}$ of each grinding head motor of motors 22b-32b, a device 10 to monitor the height of each grinding head relative to the surface of the product $10D_n$ (n=1-6), a device 18 to monitor the velocity $V_b$ of the conveyor belt, devices 14 and 16, to monitor the product thickness before and after, respectively, processing the input thickness and the output thickness respectively, a device to monitor the amount of wear of each grinding head pad of pads 22c-32c, and a device to monitor the reciprocating speed and location of the frame 44.

The controller 20 stores in its computer memory the information collected above.

The polishing assembly 50, the main conveyor device or system 4, and each process parameter collection device are connected as shown in FIG. 1 and is configured to perform the program in response to the computer processor of the controller 20 as shown in FIG. 2.

More specifically, as shown in FIG. 3 and FIG. 4, grinding head assemblies 22, 24, 26, 28, 30, and 32, are comprised of grinding heads 22c, 24c, 26c, 28c, 30c, and 32c, respectively, as shown in FIGS. 3-4, a corresponding grinding head main motor 22b, 24b, 26b, 28b, 30b, and 32b, and grinding head height adjustment motor 22a, 24a, 26a, 28a, 30a, and 32a, respectively. The six grinding head assemblies 22, 24, 26, 28, 30, and 32 may be arranged at equal distances, spaced apart from each other equally, and mounted on the reciprocating arm 44 of the overall grinding assembly 50. Grinding assembly 50 is driven by grinding assembly motors 46a and 46b. The travel distance of the reciprocating arm 44 and speed may be controlled by the computer processor of the controller 20 in order to ensure polishing heads or pads 22c, 24c, 26c, 28c, 30c, and 32c can cover at least the width of the product or slab 200, which is typically less than the width of conveyor belt 34. The conveyor belt 34 speed may be adjusted to efficiently work with the reciprocating arm 44. Polishing assembly motors 46a and 46b are synchronized to ensure that the length of reciprocating arm 44 is always at a ninety-degree angle with the length of conveyor belt 34.

The grinding head pads 22c, 24c, 26c, 28c, 30c, and 32c, in at least one embodiment, are the same. The current across each grinding head motor of motors 22b, 24b, 26b, 28b, 30b, and 32b is configured to be between $I_{dmin}$ and $I_{dmax}$, with the optimal value as the upper limit $I_{dmax}$. $T_h$ is specified as the maximum thickness of the product or slab 200 to be processed prior to processing as measured by device 14. $T_l$ is specified as the minimum thickness of the product or slab 200 to be processed prior to processing as measured by device 14. $T_0$ is specified as the thickness or size required for the finished product after processing. $T_{max}$ is the maximum allowed thickness of the product prior to processing so that $T_h \leq T_{max}$, $T_h \geq T_l \geq T_0$.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a controller including a computer memory and a computer processor;
at least two cutting head assemblies;
wherein a computer program is stored in the computer memory;
wherein each of the at least two cutting head assemblies includes a cutting head motor;
wherein the computer processor is configured to execute the computer program to perform the following steps:

receive a real time load current of each cutting head motor of each of the at least two cutting head assemblies;
control the real time load current of each cutting head motor of each of the at least two cutting head assemblies to be within a range defined by a lower limit and an upper limit in response to the received real time load current of each of the at least two cutting head assemblies;
determine a value based on the real time load currents of at least two cutting head motors of the at least two cutting head assemblies which are actively participating in grinding; and
adjust one or more of the real time load currents of the cutting head motors of the at least two cutting head assemblies based on the value.

2. A method comprising:
receiving a real time load current of each cutting head motor of each of at least two cutting head assemblies at a controller; and
controlling through use of a controller, the real time load current of each cutting head motor of each of the at least two cutting head assemblies to be within a range defined by a lower limit and an upper limit in response to the received real time load current of each of the at least two cutting head assemblies;
and wherein the upper and lower limit are stored in computer memory;
and further comprising determining a value based on the real time load currents of at least two of the cutting head motors of the at least two cutting head assemblies which are actively participating in grinding; and
adjusting one or more of the real time load currents of the cutting head motors of the at least two cutting head assemblies based on the value.

3. An apparatus comprising:
a controller including a computer memory and a computer processor;
at least two cutting head assemblies;
wherein a computer program is stored in the computer memory;
wherein each of the at least two cutting head assemblies includes a cutting head motor;
wherein the computer processor is configured to execute the computer program to perform the following steps:
receive a real time load current of each cutting head motor of each of the at least two cutting head assemblies;
control the real time load current of each cutting head motor of each of the at least two cutting head assemblies to be within a range defined by a lower limit and an upper limit in response to the received real time load current of each of the at least two cutting head assemblies;
determine a real time average load current of at least two cutting head motors of the at least two cutting head assemblies which are actively participating in grinding; and
adjust one or more of the real time load currents of the cutting head motors of the at least two cutting head assemblies to approach the real time average load current.

4. The apparatus of claim 3 further comprising
a feeding mechanism for inserting a hard material between the at least two cutting head assemblies and the feeding mechanism;
wherein the computer processor is configured to execute the computer program to control the speed of the feeding mechanism to thereby ensure that the real time load current of each cutting head motor of each of the at least two cutting head assemblies is within the range.

5. The apparatus of claim 3 wherein
each of the at least two cutting head assemblies includes a cutting head pad which is configured to perform a cutting function on a hard material.

6. The apparatus of claim 3 wherein
the computer processor is configured to execute the computer program to detect the size of a hard material and to control the at least two cutting head assemblies to reduce the size of the hard material to a desired size within a predetermined tolerance.

7. The apparatus of claim 4 wherein
the computer processor is configured to execute the computer program to set an initial position of each of the at least two cutting head assemblies above the feeding mechanism prior to insertion of the hard material between the feeding mechanism and one or more of the at least two cutting head assemblies.

8. The apparatus of claim 7 wherein
the computer processor is configured to execute the computer program to adjust the position of each of the at least two cutting head assemblies as the hard material moves in between the at least two cutting head assemblies.

9. The apparatus of claim 5 wherein
the computer processor is configured to execute the computer program to monitor the abrasiveness of each cutting head pad of each of the at least two cutting head assemblies, and to provide a signal to indicate when one or more of the cutting head pads of the at least two cutting head assemblies should be replaced due to sufficient wear.

10. The apparatus of claim 4 wherein
the at least two cutting head assemblies are fixed to a frame which is configured to move along one or more tracks, in a direction perpendicular to movement of the feeding mechanism.

11. The apparatus of claim 4 wherein
the feeding mechanism includes a conveyor belt.

12. The apparatus of claim 4 wherein
the computer processor is configured to execute the computer program to adjust the position of each of the at least two cutting head assemblies as the hard material moves in between the at least two cutting head assemblies and the feeding mechanism.

13. The apparatus of claim 3 wherein
one or more of the real time load currents of the cutting head motors of the at least two cutting head assemblies is adjusted to approach the real time average load current by adjusting a position of a corresponding cutting head assembly of the at least two cutting head assemblies with respect to a slab which is subject to grinding.

14. The apparatus of claim 3 wherein
if the real time average load current is less than the upper limit, the computer processor is further configured to execute the computer program to cause the real time average load current to be adjusted to approach the upper limit.

15. A method comprising:
receiving a real time load current of each cutting head motor of each of at least two cutting head assemblies at a controller; and controlling through use of the controller, the real time load current of each cutting head motor of each of the at least two cutting head assemblies to be within a range defined by a lower limit and an upper limit in response to the received real time load current of each of the at least two cutting head assemblies;

and wherein the upper and lower limit are stored in computer memory;

and further comprising determining a real time average load current of at least two of the cutting head motors of the at least two cutting head assemblies which are actively participating in grinding; and adjusting one or more of the real time load currents of the cutting head motors of the at least two cutting head assemblies to approach the real time average load current.

16. The method of claim 15 further comprising using a feeding mechanism to feed a hard material between the at least two cutting head assemblies and the feeding mechanism; and controlling the speed of the feeding mechanism by use of the controller to thereby ensure that the real time load current of each cutting head motor of each of the at least two cutting head assemblies is within the range.

17. The method of claim 15 wherein each of the at least two cutting head assemblies includes a cutting head pad which is configured to perform a cutting function on a hard material.

18. The method of claim 15 further comprising using the controller to detect the size of a hard material and to control the at least two cutting head assemblies to reduce the size of the hard material to a desired size within a predetermined tolerance.

19. The method of claim 16 further comprising using the controller to set an initial position of each of the at least two cutting head assemblies above the feeding mechanism prior to insertion of the hard material between the feeding mechanism and one or more of the at least two cutting head assemblies.

20. The method of claim 19 wherein using the controller to adjust the position of each of the at least two cutting head assemblies as the hard material moves in between the at least two cutting head assemblies.

21. The method of claim 17 wherein using the controller to monitor the abrasiveness of each cutting head pad of each of the at least two cutting head assemblies, and to provide a signal to indicate when one or more of the cutting head pads of the at least two cutting head assemblies should be replaced due to sufficient wear.

22. The method of claim 16 wherein the at least two cutting head assemblies are fixed to a frame which is configured to move along one or more tracks, in a direction perpendicular to movement of the feeding mechanism.

23. The method of claim 16 wherein the feeding mechanism includes a conveyor belt.

24. The method of claim 16 further comprising using the controller to adjust the position of each of the at least two cutting head assemblies as the hard material moves in between the at least two cutting head assemblies and the feeding mechanism.

25. The method of claim 12 wherein one or more of the real time load currents of the cutting head motors of the at least two cutting head assemblies is adjusted to approach the real time average load current by adjusting a position of a corresponding cutting head assembly of the at least two cutting head assemblies with respect to a slab which is subject to grinding.

26. The method of claim 15 wherein if the real time average load current is less than the upper limit, the computer processor is further configured to execute the computer program to cause the real time average load current to be adjusted to approach the upper limit.

* * * * *